United States Patent
Chiang et al.

(10) Patent No.: US 11,673,986 B2
(45) Date of Patent: Jun. 13, 2023

(54) ACRYLIC MODIFIED POLYESTER RESIN AND PREPARATION METHOD THEREOF

(71) Applicant: ETERNAL MATERIALS CO., LTD., Kaohsiung (TW)

(72) Inventors: Ping-Rui Chiang, Kaohsiung (TW); Yen-Chi Hsu, Kaohsiung (TW); De-You Jhang, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 217 days.

(21) Appl. No.: 16/908,830

(22) Filed: Jun. 23, 2020

(65) Prior Publication Data

US 2021/0130524 A1    May 6, 2021

(30) Foreign Application Priority Data

Nov. 5, 2019   (TW) .................. 108140113

(51) Int. Cl.
| | | |
|---|---|---|
| C08F 283/01 | (2006.01) | |
| C09D 167/02 | (2006.01) | |
| C08F 220/18 | (2006.01) | |
| C08F 220/20 | (2006.01) | |
| C08L 67/02 | (2006.01) | |

(52) U.S. Cl.
CPC .......... *C08F 283/01* (2013.01); *C09D 167/02* (2013.01); *C08F 220/18* (2013.01); *C08F 220/20* (2013.01); *C08L 67/02* (2013.01)

(58) Field of Classification Search
None
See application file for complete search history.

(56) References Cited

U.S. PATENT DOCUMENTS

| | | | | |
|---|---|---|---|---|
| 4,340,519 A | * | 7/1982 | Kotera | .................... C08L 67/02 |
| | | | | 428/458 |
| 2015/0056376 A1 | | 2/2015 | Ishikura et al. | |
| 2015/0232693 A1 | * | 8/2015 | Ishikura | ................ B05D 7/572 |
| | | | | 428/423.1 |
| 2019/0071586 A1 | * | 3/2019 | Hasegawa | .............. C09D 5/022 |
| 2019/0315903 A1 | * | 10/2019 | Powell | ................ C08K 5/3492 |
| 2021/0277163 A1 | * | 9/2021 | Retsch, Jr. | ............. C08G 63/54 |

FOREIGN PATENT DOCUMENTS

| | | | |
|---|---|---|---|
| CN | 1520434 A | * | 8/2004 |
| CN | 102875945 A | | 1/2013 |
| CN | 102911371 A | | 2/2013 |

(Continued)

OTHER PUBLICATIONS

CN103554381 A _ English Abstract (undated).

(Continued)

*Primary Examiner* — Vivian Chen
(74) *Attorney, Agent, or Firm* — Ladas & Parry LLP (57) ABSTRACT

The present disclosure relates to an acrylic modified polyester resin, and specifically, a modified polyester resin prepared by grafting an acrylic monomer to a polyester prepolymer. The polyester prepolymer is formed from pentaerythritol, a polyol monomer, an organic polycarboxylic acid monomer and a cycloalkanedicarboxylic acid monomer and contains a double bond on its backbone.

The present disclosure also relates to a method for preparing the acrylic modified polyester resin.

12 Claims, 5 Drawing Sheets

(56) References Cited

FOREIGN PATENT DOCUMENTS

| | | |
|---|---|---|
| CN | 103554381 A | 2/2014 |
| CN | 108713046 A | 10/2018 |
| JP | 2002-302639 A | 10/2002 |
| JP | 4942482 B2 | 5/2012 |
| WO | 2016/121241 A1 | 8/2016 |
| WO | 2018/111854 A1 | 6/2018 |

OTHER PUBLICATIONS

CN 102875945 _ A English Abstract (undated).
Taiwanese Office Action and Search Report dated Aug. 10, 2020.
Search Report ROC (Taiwan) Patent Application No. 108140113 dated Aug. 10, 2020 (Translation).
CN 108713046 A _ English Translation (undated).
CN 102911371 A _ English Translation (undated).
WO 2016/121241 A1 _ English Translation (undated).
JP 4942482 B2 _ English Translation (undated).
JP 2002-302639 A _ English Translation (undated).

\* cited by examiner (a) (b) (c)

ACRYLIC MODIFIED POLYESTER RESIN AND PREPARATION METHOD THEREOF

BACKGROUND

1. Field of the Disclosure

The present disclosure relates to an acrylic modified polyester resin and a preparation method thereof and more particularly to a water-thinnable acrylic modified polyester resin.

2. Description of the Related Art

Coating compositions can be applied to a surface of an article to provide protection or a decorative effect, have wide applications and perform different functions in various areas. Therefore, how to obtain a coating with desired properties becomes an important topic.

One common approach is to prepare a multi-layer coating on a surface of an article using a sane or different coating composition. For example, one or more layers, such as an ink layer, a varnish layer, a top coat, and a protective layer, may be further applied after a primer is applied. The main characteristics of the primer are its good adhesion to the surfaces of the coated substrate and the ink layer; the ink layer can provide a desired pattern; the main characteristics of the varnish layer are high hardness (abrasion resistance) and high flexibility (to prevent the coating from cracking when impacted) and high gloss. When applied to food packaging materials, the coating has to be resistant to boiling and steam sterilization, and have high hardness, high flexibility, and a certain extent of chemical resistance, so that the integrity of the coating can be maintained during the manufacturing process. When applied to the automotive industry or building materials, it is also preferable that the coating is resistant to boiling and steam sterilization, and has high hardness, high flexibility and a certain extent of chemical resistance due to frequent exposure to the external environment. For aesthetic reasons, the coating may also be required to have high gloss.

Common coating compositions include acrylic-based coating compositions, polyester-based coating compositions, alkyd-based coating compositions and the lice. It is generally believed that the coating prepared from the polyester-based coating compositions is superior to that from the alkyd-based coating compositions in adhesion to the surface of a substrate to be coated, and also in hardness, thermal replasticizability, and yellowing resistance, and superior to that from the acrylic coating compositions in leveling property, fullness and impact resistance (flexibility).

However, a problem faced by the polyester-based coating compositions is insufficient resistance to boiling and steam sterilization, and the ester linkage on the polymer backbone is prone to breakage due to hydrolysis at a high temperature, so that the performance of the coating deteriorates due to disintegration of the chemical structure. Furthermore, due to environmental protection policies, many countries are expected to reduce the usage of volatile organic compounds (VOCs), so it is a trend in the field of coating from using a resin system containing a large amount of VOCs to a water thinnable resin system, whereby the purpose of reducing the usage of VOCs can be achieved by diluting with water. The water thinnable resins are mostly designed to introduce a functional group having superior hydrophilicity, such as a carboxylic acid group or a sulfonic acid group, in their polarity of molecules, to increase the solubility or compatibility of the resin in water. However, by introducing a hydrophilic functional group-modified polyester resin, the coating is liable to be excessively hydrophilic, resulting in worse water resistance and steam sterilization resistance compared to the coating prepared from unmodified polyester. Therefore, polyester-based coating compositions still have room for continuous improvement.

In order to solve the above problems, various methods have been disclosed in the prior art. In CN103554381A, an acrylic modified polyester is synthesized by introducing glycidyl tertcarbonate to enhance the water resistance, alkali resistance and acid resistance of the coating. However, CN103554381A does not disclosed that the coating formed from the resin still has good water resistance at a high temperatures so that it can pass the harsh tests, such as boiling resistance test or steam sterilization resistance test.

In addition, attempts are made to use glycidyl tertcarbonate to protect the ester linkage on the backbone by means of steric hindrance in the prior art (CN 102875945 A). However, the present inventors have found that even in the case of using glycidyl tertcarbonate for modification, the obtained polyester usually remains stable only for 3 to 7 days in an environment of 60° C. after dilution with water; white precipitates can be found after 7 days, and the properties of the coating such as gloss and transparency are degraded. Where treated with boiling water, the coating is blistered and peeled off, so that the adhesion is remarkably lowered.

In view of this, there is a need in the art for an acrylic modified polyester resin which not only retains the advantages of good flexibility and solvent resistance, but also is resistant to high-temperature steam sterilization, thus having broadened areas of application.

SUMMARY

In order to solve the above problems, the present inventors have found after continuous researches that by using a polyester prepolymer and a cycloalkanedicarboxylic acid monomer and then controlling the way to introducing a (meth)acrylic monomer, it is possible to prepare an acrylic modified polyester resin that not only has the advantages of good flexibility, high solvent resistance, and high water resistance, but also is resistant to boiling and high-temperature steam sterilization. Accordingly, an object of the present disclosure is to provide a novel acrylic modified polyester resin, which comprises:

(i) a polyester, comprising a unit derived from a polyester prepolymer and a cycloalkanedicarboxylic acid monomer, wherein the polyester prepolymer is prepared by polycondensation of the following monomers:
   (A-1) pentaerythritol,
   (A-2) a triol,
   (A-3) a diol, and
   (A-4) an organic polycarboxylic acid monomer, or an ester or an anhydride thereof, wherein the organic polycarboxylic acid comprises an aromatic polycarboxylic acid, an alkane-polycarboxylic acid, an alkene-polycarboxylic acid or a combination thereof and (ii) a (meth)acrylic monomer grafted to the polyester, where at least one of the monomers (A-2), (A-3) and (A-4) has a double bond, and the (meth)acrylic monomer is grafted to the polyester through a reaction with the double bond.

In the spectrum obtained by pyrolysis-gas chromatography-mass spectrometry (PY-GC-MS) of the acrylic modified polyester resin according to the present disclosure, the ratio of the signal integral value of pentaerythritol to the triol is between 0.05 and 0.35, and the coating formed by the acrylic modified polyester resin has a gloss at 60° of at least 76 measured according to GB/T9754-2007 standard, and a gloss at 60° of at least 67 after the coating is subjected to a steam sterilization (121° C./30 min) resistance test.

The present disclosure also relates to a method for preparing the aforementioned acrylic modified polyester resin, which comprises the steps of:
(1) polycondensing the monomers (A-1), (A-2), (A-3), and (A-4), and a cycloalkanedicarboxylic acid to form a polyester, wherein at least one of the monomers (A-2), (A-3) and (A-4) comprises a double bond; and
(2) grafting a (meth)acrylic monomer to the polyester by reacting with the double bond, to form the acrylic modified polyester resin.

The present disclosure also relates to a coating composition comprising the acrylic modified polyester resin.

DETAILED DESCRIPTION

Each aspect and each embodiment of the present disclosure may be individually combined with anyone or all of the other aspects and embodiments. The present disclosure includes all of possible combinations thus-formed.

In the specification and the claims, the singular terms of "a," "an," and "the" includes plural referents, unless the context clearly dictates otherwise. Unless otherwise dictated, any or all examples or exemplary language (such as "for example") provided herein are merely used for describing the invention, but are not intended to limit the scope of the invention. The language in the specification should not be interpreted as indicating that any non-claimed elements are necessary to practice the invention.

It should be understood that all numeric ranges used in this specification are intended to include all sub ranges included by the numeric ranges. For example, a range "from 50° C. to 70° C." includes all sub ranges between a minimum value 50° C. and a maximum value 70° C. (for example, from 58° C. to 67° C., from 53° C. to 62° C., 60° C. or 68° C.), and includes the two values 50° C. and 70° C. That is, a range in which a minimum value is greater than or equal to 50° C. and a maximum value is less than or equal to 70° C. is included. Since the disclosed numeric range is continuous, the numeric range includes each value between the minimum and the maximum. Unless otherwise stated, the numeric ranges specified in this specification are approximate values.

Definition

As used herein, the term "hydrocarbyl" refers to an organic group comprising exclusively carbon and hydrogen atoms in the main structure, such as an alkyl group, a cycloalkyl group, an alkenyl group, a cycloalkenyl group, an alkynyl group, an aryl group or the like. The hydrocarbyl group used herein may be unsubstituted or optionally substituted with a suitable substituent, for example, a halogen, a nitro group, a hydroxyl group, a cyano group, an alkyl group or the like.

As used herein, the term "alkyl" refers to a group derived from an alkane of the general formula $C_nCH_{2n+2}$, which may be straight or branched Examples of alkyl groups include, for example, but are not limited to, methyl, ethyl, n-propyl, isopropyl, n-butyl, isobutyl, sec-butyl, tert-butyl, $C_5$-alkyl and isomers, $C_6$-alkyl and isomers, $C_7$-alkyl and isomers, and an alkyl group containing 8 or more carbon atoms and isomers thereof.

As used herein, the term "cycloalkyl" refers to a group derived from a fully saturated hydrocarbon molecule having a ring in the structure. Examples of cycloalkyl groups include monocyclic alkyl groups such as, but not limited to, cyclopropyl, cyclobutyl, cyclopentyl, methylcyclobutyl, cyclohexyl and other cycloalkyl groups having 6 or more carbon atoms and isomers thereof and bicyclic or polycyclic groups, for example, isobornyl.

As used herein, the term "aryl" refers to a group derived from an aromatic hydrocarbon molecule Examples of aryl groups include a monocyclic group such as a phenyl group, a tolyl group, a xylyl group or the like; a bicyclic group such as a biphenyl group, a naphthyl group or the like; or a polycyclic group such as an anthracenyl group, a phenanthryl group or the like.

As used herein, the term "-ylene" or "-ylidene" refers to a hydrocarbon group that is divalently attached to other structures. For example, "alkylene" means a divalent group derived from an alkane molecule.

As used herein, the term "alcohol" refers to a molecule having at least one —OH group in its molecular structure. The term "polyol" refers to a molecule containing two or more —OH groups in the structure. For convenience of expression, the terms "diol" and "triol" are also used to specifically indicate the number of —OH groups contained in the molecule.

As used herein, the term "polycarboxylic acid" refers to a molecule having at least two —COOH groups in its molecular structure, or a molecule having a structure derived from —COOH in its molecular structure and capable of producing at least two —COOH groups by hydrolysis, where such a derived structure is, for example, an ester or an anhydride. For convenience of expression, the terms "dicarboxylic acid" and "tricarboxylic acid" are also used to specifically indicate the number of —COOH groups contained in the molecule.

As used herein, the term "(meth)acrylic acid" means "acrylic or methacrylic acid"; and the term "(meth)acrylic monomer" means "acrylic or methacrylic monomer." The other related terms can be deduced accordingly.

Where the above definitions for groups or molecules conflict with each other, they are named according to the importance of the functional groups. The naming conventions can also refer to the regulations promulgated by the International Union of Pure and Applied Chemistry (IUPAC).

In the present disclosure, the term "boiling," "boiling resistance" and the like relate to a process or test carried out in boiling water. To distinguish from "boiling" the term "steam sterilization," "high-temperature steam sterilization" and the like relate to a process or test carried out under pressurized saturated steam at 121° C. for 30 minutes.

1. Polyester Prepolymer

Polyester is generally obtained by dehydration and condensation polymerization (i.e., polycondensation) of one or more polyols with one or more polycarboxylic acids (anhydrides or esters). The polyester according to the present disclosure comprises a unit derived from a polyester prepolymer and a cycloalkanedicarboxylic acid monomer.

In the present disclosure, the polyester prepolymer is prepared by polycondensation of the reactants comprising the following monomers: (A-1) pentaerythritol, (A-2) triol, (A-3) diol, and (A-4) organic polycarboxylic acid monomer, or an ester or anhydride thereof. At least one of the monomers (A-2), (A-3) and (A-4) has a double bond, so the (meth)acrylic monomer can be grafted to the polyester through a reaction with the double bond in a subsequent step.

The types and amounts of the monomers used for forming the polyester prepolymer are described below.

Monomer (A-1): Pentaerythritol

The present inventors have found that by introducing pentaerythritol (monomer (A-1); 2,2-bis(hydroxymethyl)-1,3-propanediol) into the polyester backbone, the degree of branching of the polyester can be enhanced, and the chemical structure of the coating obtained is strengthened. As the degree of branching increases, the network structure of the coating becomes more dense, making it difficult for water molecules to penetrate into the structure of the coating, thereby inhibiting hydrolysis and improving the adhesion of the coating to the suttee of an article. Particularly, in an embodiment where the polyester and a curing agent are used in combination, the crosslink density is further increased and the effect is march better.

However, if the amount of pentaerythritol is too high, excess cross-linking may be formed during the resin synthesis process, and thus gelation may occur easily. If the amount of pentaerythritol is insufficient, some ester linkages in the polyester structure of the coating are degraded by hydrolysis during the steam sterilization process, and the gloss and solvent resistance are worse. In an embodiment, the content of the monomer (A-1) is about 0.07 mol % to about 3 mol %, preferably about 0.1 mol % to about 2.5 mol %, and more preferably about 0.2 mol % to about 1.26 mol %, based on the total moles of the monomers for forming the acrylic modified polyester resin. If the content is less than 0.07 mol %, the degree of branching in the coating structure is insufficient, and a dense network cannot be formed, resulting in poor water resistance, and reduced gloss after a steam sterilization process. If the content is higher than 3 mol %, the resin is prone to aggregation and gelation during the synthesis process.

Monomer (A-2): Triol

By introducing both pentaerythritol (monomer (A-1)) and a triol (monomer (A-2)) to the polyester backbone, the monomer (A-2) exerts a synergistic effect so that even if some of the ester linkages in the polyester structure of the coating are degraded by hydrolysis during the boiling or steam sterilization process, the structure is not disintegrated to an extent that would cause the coating to peel off and thus good gloss can be maintained. The ratio of the amount of the monomer (A-1) to the mount of the monomer (A-2) can be adjusted according to the desired ratio. In some embodiments of the present disclosure, the ratio (in moles) of the amount of the monomer (A-1) to the amount of the monomer (A-2) is from about 0.02 to about 0.9, preferably from about 0.04 to about 0.6, more preferably from about 0.05 to about 0.37. If the ratio of the amount of the monomer (A-1) to the amount of the monomer (A-2) is less than 0.02, the initial gloss of the coating is not good, the gloss after the steam sterilization process is greatly reduced, and the storage stability is deteriorated. If the ratio of the amount of the monomer (A-1) to the amount of the monomer (A-2) is higher than 0.9, the resin is gelled and cannot flow because the ratio of the pentaerythritol monomer is too high.

The monomer (A-2) used in the present disclosure is a triol, and examples thereof include, but are not limited to, an alkyl triol, an alkenyl triol, a cycloalkyl triol or a combination thereof and preferably an alkyl triol, an alkenyl triol or a combination thereof.

Examples of alkyl triols include, but are not limited to, ethanetriol, glycerol, butanetriol, pentanetriol (e.g. 1,1,1-trimethylolethane), hexanetriol (e.g. 1,1,1-trimethylolpropane) and a linear or branched alkanetriol having 7 to 10 carbon atoms.

Examples of alkenyl triols include, but are not limited to, butenetriol, pentenetriol, hexenetriol, and a linear or branched alkenetriol having 7 to 10 carbon atoms.

Examples of cycloalkyl triols include, but are not limited to, cyclohexanetriol (e.g., 1,3,5-cyclohexanetriol), 1,2,3-cyclopentanetriol, and cycloalkanetriol having from 7 to 10 carbon atoms.

In one embodiment of the present disclosure, so that the coating is less likely to be blistered and peeled off in the boiling water, and has excellent adhesion. The triol (monomer (A-2)) used in the present disclosure is an alkyl triol, and preferably hexanetriol (e.g. 1,1,1-trimethylolpropane).

In one embodiment, the content of the monomer (A-2) is from about 0.1 mol % to about 10 mol %, preferably from about 1 mol % to about 5 mol %, and more preferably from about 3 mot % to about 4 mol %, based on the total moles of monomers for forming the acrylic modified polyester resin. If the content of the monomer (A-2) is less than 0.1 mol %, the degree of branching in the coating structure is insufficient, and a dense network cannot be formed, resulting in poor water resistance, and reduced gloss of the coating after a steam sterilization process. If the content is higher than 10 mol %, the resin is prone to gelation during the synthesis process.

Monomer (A-3): Diol

The monomer (A-3) used in the present disclosure is a diol, and examples thereof include, but are not limited to, an alkyl diol, an alkenyl diol, a cycloalkyl diol or a combination thereof and preferably an alkyl diol, an alkenyl diol or a combination thereof.

Examples of alkyl diols include, but are not limited to, ethylene glycol, 1,2-propanediol, 1,3-propanediol, 1,2-butanediol, 1,4-butanediol, pentanediols (e.g., neopentanediol), hexanediol (e.g., 1,6-hexanediol), and a linear or branched alkanediol having 7 to 10 carbon atoms (e.g., 2-butyl-2-ethyl-1,3-propanediol).

Examples of alkenyl diols include, but are not limited to, butene diols (e.g., 1,4-butene diols), pentene diols (e.g., methylbutene diols, including isopentenyl diol), hexene diols (e.g., 3-hexene-2,5-diol) and a linear or branched alkenediol having 7 to 10 carbon atoms.

Examples of cycloalkyl diols include, but are not limited to, cyclobutanediol (e.g., 2,2,4,4,-tetramethyl-1,3-cyclobutanediol), cyclopentanediol, cyclohexanediol (e.g., 1,4-cyclohexanedimethanol) and a cycloalkane diol having 7 to 10 ring carbon atoms.

In one embodiment, the content of the monomer (A-3) is from about 20 mol % to about 60 mol %, preferably from about 35 mol % to about 50 mol %, and more preferably from about 30 mol % to about 40 mol %, based on the total moles of monomers for forming the acrylic modified polyester resin.

Monomer (A-4): Organic Polycarboxylic Acid Monomer, Ester or Anhydride Thereof

The organic polycarboxylic acid monomer, or an ester or an anhydride thereof (monomer (A-4)) used in the present disclosure has at least 2 functionalities (carboxyl group or a group capable of producing a carboxyl group) which can be polycondensed with the above alcohol monomers (monomers (A-1), (A-2), and (A-3)) to prepare a polyester prepolymer. The organic polycarboxylic acid is selected from the group consisting of an aromatic polycarboxylic acid, alkane-polycarboxylic acid, and alkene-polycarboxylic acid.

Examples of the aforesaid aromatic polycarboxylic acid, or an ester or an anhydride thereof include, but are not limited to, terephthalic acid, isophthalic acid, phthalic acid, methyl benzene dicarboxylic acid (e.g., 1,4-dimethyl terephthalic acid or 1,3-dimethylisophthalic acid), 1,2,4-benzenetricarboxylic acid, diphenyl-4,4'-dicarboxylic acid, 2,6-naphthalenedicarboxylic acid, 2,7-naphthalenedicarboxylic acid, 1,4-naphthalenedicarboxylic acid, 1,5-naphthalenedicarboxylic acid, diphenoxyethane-4,4'-dicarboxylic acid, diphenyl sulfone-4,4'-dicarboxylic acid, diphenyl ether-4,4'-dicarboxylic acid, trimellitic acid, or an ester or anhydride of the foregoing acids.

Examples of the aforesaid alkane-polycarboxylic acid, or an ester or an anhydride thereof include, but are not limited to, oxalic acid, malonic acid, succinic acid, glutaric acid, adipic acid, pimelic acid, suberic acid, azelaic acid, sebacic acid, dodecanedioic acid, or an ester or an anhydride thereof.

Examples of the aforesaid alkene-polycarboxylic acid, or an ester or an anhydride thereof include, but are not limited to, butenedioic acid (far example, maleic acid or fumaric acid), glutaconic acid (for example, itaconic acid), hexendioic acid, or an ester or an anhydride thereof.

According to some embodiments of the present disclosure, the monomer (A-4) of the present disclosure may further comprise additional organic polycarboxylic acid monomers, an ester or an anhydride thereof for example, but not limited to, a cycloaliphatic polycarboxylic acid, or an ester or an anhydride thereof. The aforesaid cycloaliphatic polycarboxylic acid, or an ester or an anhydride thereof may be a cycloalkane polycarboxylic acid or a cycloalkene polycarboxylic acid, or an ester or an anhydride thereof. Examples include, but are not limited to, cyclopropanedicarboxylic acid, cyclobutanedicarboxylic acid, cyclopentanedicarboxylic acid, cyclohexanedicarboxylic acid (e.g., 1,4-cyclohexanedicarboxylic acid), cyclohexanetricarboxylic acid (e.g., 1,2,5-cyclohexanetricarboxylic acid or 1,2,4-cyclohexanetricarboxylic acid), or an ester or an anhydride of the foregoing acids.

In some embodiments of the present disclosure, the content of the monomer (A-4) is from about 5 mol % to about 35 mol %, preferably from about 10 mol % to about 30 mol %, and more preferably from about 15 mol % to about 25 mol %, based on the total moles of monomers for forming the acrylic modified polyester resin.

According to some embodiments of the present disclosure, the obtained polyester prepolymer has an acid value of not more than 10 mgKOH/g, such as 10 mgKOH/g, 8 mgKOH/g, 6 mgKOH/g, 4 mgKOH/g or 2 mgKOH/g, preferably an acid value of not more than 6 mgKOH/g.

2. Polyester

As described above, in the present disclosure, a polyester prepolymer is prepared firstly by polycondensation of monomers comprising pentaerythritol, the triol, the diol, and the organic polycarboxylic acid monomer, or an ester thereof or an anhydride thereof. Preferably, after the polyester prepolymer is prepared, a cycloalkanedicarboxylic acid (monomer (B)) is thither added to undergo polycondensation with an alcohol group remaining on the polyester prepolymer to prepare a polyester.

The type and amount of the monomer (B) are described below.

Monomer (B): Cycloalkanedicarboxylic Acid

The present inventors further find that in addition to strengthening the chemical structure of the coating by introducing pentaerythritol into the polyester backbone, the polycondensation of a cycloalkanedicarboxylic acid (monomer (B)) with the polyester prepolymer further enhances the hydrolysis resistance of the polyester, so that the resulting polyester is unlikely to hydrolyze even at high temperatures. The present inventors believe (without being bound by theory) that this may be due to the electron donating effect of the cycloalkanedicarboxylic acid on the ester linkage of the polyester prepolymer, which allows synergy with the pentaerythritol in the polyester prepolymer. Thus, the hydrolysis reaction can be further inhibited and the stability of the coating is increased.

In some embodiments of the present disclosure, the cycloalkanedicarboxylic acid monomer is used as a linking group for the polyester prepolymer. In some embodiments of the present disclosure, the cycloalkanedicarboxylic acid is used as an end group of the polyester prepolymer.

Examples of the cycloalkanedicarboxylic acid monomer include, but are not limited to, cyclopropanedicarboxylic acid, cyclobutanedicarboxylic acid, cyclopentanedicarboxylic acid, cyclohexanedicarboxylic acid (e.g., 1,4-cyclohexanedicarboxylic acid), and hexahydrophthalic anhydride and the like.

In one embodiment, the content of the monomer (B) is from about 5 mol % to about 15 mol %, preferably from about 6 mol % to about 13 mol %, and more preferably from about 8 mol % to about 11 mol %, based on the total moles of monomers for forming the acrylic modified polyester resin. If the content of the monomer (B) is less than 5 mol %, the ester linkage cannot be protected by sufficient electron-donating groups, and the resin has poor stability and is susceptible to separate into layers after dilution with water. If the content of the monomer (B) is more than 15 mol %, the coating formed by the resin has problems such as poor mechanical performance and insufficient hardness.

According to some embodiments of the present disclosure, the obtained polyester has an acid value of not more than 15 mgKOH/g, such as 15 mgKOH/g, 12 mgKOH/g, 10 mgKOH/g, 8 mgKOH/g, 6 mgKOH/g, 4 mgKOH/g or 2 mgKOH/g, preferably an acid value of not more than 10 mgKOH/g, and thither preferably an acid value of not more than 8 mgKOH/g.

3. Acrylic Modified Polyester Resin

As described above, at least one of the monomers (A-2), (A-3) and (A-4) for forming the polyester prepolymer has a double bond, so the obtained polyester has a double bond for an addition reaction. Therefore, a (meth)acrylic monomer (monomer (C)) can be farther reacted with the double bond to prepare an acrylic modified polyester resin. The monomer having a double bond includes, but is not limited to, an alkenyl triol, an alkenyl diol, and an alkenyl polycarboxylic acid, or an ester or an anhydride thereof. The introduced amount of the monomer with a double bond will affect the modification of the polyester. The content of the monomer with a double bond is from about 1 mol % to about 4.1 m %, preferably from about 2.5 mol % to about 3.5 mol %, and more preferably from about 2 mol % to about 3 mol %, based on the total moles of monomers for forming the acrylic modified polyester resin. If the content is less than 1 mol %, self-polymerization of the acrylic monomer is extremely likely to occur. The resin comprises both polyester and polyacrylic acid, and the resin appears cloudy white due to the poor compatibility between the polyester and the polyacrylic acid. If the content is higher than 4.1 mol %, a large number of double bonds are self-crosslinked, the viscosity of the resin rises rapidly, and the resin is easily gelled during the synthesis process.

Monomer (C): (Meth)Acrylic Monomer

In the present disclosure, a (meth)acrylic monomer is used as a modifying monomer (monomer (C)), and the (meth)acrylic monomer is grafted to the polyester by reacting the double bond on the polyester with the double bond of the monomer (C), to form the acrylic modified polyester resin of the present disclosure, thereby improving the mechanical strength and chemical resistance of the coating while improving the hydrolysis resistance.

The (meth)acrylic monomer used in the present disclosure includes (meth)acrylic acid, alkyl (meth)acrylate or a combination thereof. Examples of the alkyl (meth)acrylate suitable for use in the present disclosure include, but are not limited to, a $C_1$-$C_{12}$ alkyl (meth)acrylate, wherein the alkyl group may be optionally substituted with a hydroxyl group.

In one embodiment, the content of the monomer (C) is from about 20 mol % to about 60 mol %, preferably from about 35 mol % to about 50 mol %, and more preferably from about 30 mol % to about 40 mol %, based on the total moles of monomers for forming the acrylic modified polyester resin.

In one embodiment, examples of the (meth)acrylic monomer used in the present disclosure include, but are not limited to, acrylic acid, methacrylic acid, methyl acrylate, ethyl acrylate, butyl acrylate, hydroxyethyl acrylate, hydroxypropyl acrylate, hydroxybutyl acrylate, lauryl acrylate, 2-ethylhexyl acrylate, methyl methacrylate, butyl methacrylate, hydroxyethyl methacrylate, hydroxypropyl methacrylate, isobornyl methylacrylate, lauryl methacrylate, 2-hydroxyethyl methacrylate, 2-ethylhexyl methacrylate, and the like.

In order to enhance the compatibility of the modified polyester resin obtained in the present disclosure with water, the monomer (C) may comprise an appropriate amount of a monomer having a hydrophilic group such as a carboxylic acid group or a sulfonic acid group. The hydrophilic group contributes to the more stable dispersion of the acrylic modified polyester resin obtained by the present disclosure in water so the acrylic modified polyester resin obtained by the present disclosure can be used as a water thinnable acrylic modified polyester resin, conforms well to environmental regulations and current trends. The monomer having a hydrophilic group is, for example, a (meth)acrylic monomer. The (meth)acrylic monomers include, but are not limited to, acrylic acid, and methacrylic acid. In addition, acrylic monomers having a lower glass transition temperature (Tg) has both softness and toughness, can prevent cracking of the coating from impact and maintain high gloss of a curved surface, and is suitable for use on outer surfaces of cans, including food cans, beverage cans, general cans, and paint cans, etc. In one embodiment, the content of the (meth)acrylic monomer is from about 0.5 mol % to about 1.2 mol %, preferably from about 0.7 mol % to about 1 mol %, and more preferably from about 0.8 mol % to about 0.9 mol %, based on the total moles of monomers for forming the acrylic modified polyester resin. If the (meth)acrylic monomer content is less than 0.5 mol %, the introduced hydrophilic groups are insufficient, and the polyester resin cannot be stably dispersed in water. If the (meth)acrylic monomer content is higher than 1.2 mol %, the excessively hydrophilic nature increases the hydrolysis of the ester linkage, resulting in poor water resistance, poor resistance to steam sterilization and poor stability.

Properties of Acrylic Modified Polyester Resin

The acrylic modified polyester resin provided in the present disclosure has a number average molecular weight (Mn) of from about 500 g/mol to about 5,000 g/mol, preferably from about 1,000 g/mol to about 3,000 g/mol, more preferably from about 1,000 g/mol to about 2,000 g/mol, and particularly preferably from about 1,000 g/mol to about 1,500 g/mol. If the number average molecular weight of the acrylic modified polyester resin is too low (for example, less than 500 g/mol), the branching ratio of the resin is low, and the reactive functional groups are insufficient, causing a too low crosslink density when reacting with a curing agent. This affects the resistance to boiling and steam sterilization of the coating, and the finished product is prone to loss of light after being boiled in water. Moreover, when the number average molecular weight of the acrylic modified polyester resin is too high (for example, higher than 5,000 g/mol), there is a problem in which the resin has a too high viscosity and is gelled and difficult to be applied.

The polydispersity index (PDI) is a ratio (Mw/Mn) of the weight average molecular weight (Mw) divided by the number average molecular weight (Mn). A larger PDI indicates a broader molecular weight distribution and a larger branching ratio. In a preferred embodiment of the present disclosure, the acrylic modified polyester resin provided in the present disclosure has a polydispersity index (PDI) in the range of 8 to 30, and preferably 8 to 20. When the PDI of the resin is less than 8, the branching ratio of the resin is too low, and the formed coating has the problem of poor resistance to boiling and steam sterilization. When the PDI of the resin is more than 30, the viscosity of the resin is high, and the crosslink density is too high, so the resin is difficult to be applied.

The acrylic modified polyester resin provided in the present disclosure has an acid value of from 20 mgKOH/g to 60 mgKOH/g, preferably from 35 mgKOH/g to 55 mgKOH/g, and more preferably from 40 mgKOH/g to 50 mgKOH/g. The carboxyl group in the resin can increase the compatibility with the solvent water and the functional group reactive with the curing agent. If the acid value is more than 60 mgKOH/g, the water resistance of the coating is poor, and the storage stability of the resin ager dilution with water is poor. If the acid value is less than 20 mgKOH/g, the resin has insufficient hydrophilic groups and a weak capacity to withstand water dilution when it is switched into a water-based resin, whereby the VOC in the coating cannot be effectively reduced.

Moreover, in the spectrum obtained by PY-GC-MS analysis of the acrylic modified polyester resin of the present disclosure, the ratio of the signal integral values of pentaerythritol to the triol is 0.05 to 0.35, preferably 0.06 to 0.33, and more preferably 0.07 to 0.3. The coating formed with the acrylic modified polyester resin of the present disclosure has high gloss. For example, the gloss at 60° measured according to the GB/T9754-2007 standard is at least 76, and the gloss at 60° alter the steam sterilization resistance test is still 67 or higher.

The composition and content of the acrylic modified polyester resin of the present disclosure are analyzed by pyrolysis-gas chromatography-mass spectrometry (PY-GC-MS). Pyrolysis-gas chromatography-mass spectrometry (PY-GC-MS) is one of the analytical methods commonly used in the field to analyze the composition of a polymer. The polymer is pyrolyzed into small volatile molecules at a high temperature, and then introduced and analyzed in a mass spectrometer (for example, gas chromatograph-mass spectrometer). The structure/composition of the polymer and the content of each component can be known from the obtained spectrum. The pyrolysis temperature used in the present disclosure is a temperature commonly used by those skilled in the art, generally between 400° C. and 900° C., and preferably between 500° C. and 600° C.

Preparation Method of Acrylic Modified Polyester Resin

The present disclosure provides a method for preparing the acrylic modified polyester resin, which comprises the steps of:

(1) polycondensing the monomers (A-1), (A-2), (A-3), and (A-4), and a cycloalkanedicarboxylic acid to form a polyester, wherein at least one of the monomers (A-2), (A-3) and (A-4) has a double bond; and (2) grafting a (meth)acrylic monomer to the polyester by reacting with the double bond, to form the acrylic modified polyester resin.

The process in the step (1) of preparing the acrylic modified polyester resin of the present disclosure may be a one-pot process where the monomers (A-1), (A-2), (A-3), and (A-4), and the cycloalkanedicarboxylic acid are polycondensed to form the polyester, or a stepwise process where the monomers (A-1), (A-2), (A-3), and (A-4) are polycondensed to form a polyester prepolymer, and then the cycloalkanedicarboxylic acid, which is used as a monomer providing protection for the ester linkage, is added and polycondensed with the alcohol group remaining on the polyester prepolymer to form the polyester. The one-pot method is easier to operate. The stepwise process is usually used in resin synthesis. In some embodiments of the present disclosure, the stepwise process is used, and the obtained polymer has better stability in water.

In the step (1), by introducing the monomer (A-1) pentaerythritol into the polyester backbone, the crosslink density of the polyester can be increased, and the stricture is strengthened, so that the structural disintegration of the polyester does not occur in the case of partial hydrolysis to cause the coating to peel off. At the same time, due to the increased crosslink density, water molecules are less likely to penetrate into the polyester structure, thereby inhibiting the hydrolysis.

In some embodiments, the ratio of the total moles of the polyol roomer for forming the polyester (i.e., monomers (A-1), (A-2) and (A-3)) to the total moles of the polycarboxylic acid monomers (A-4) and (B) is from about 0.8 to about 1.60, preferably from about 0.95 to about 1.40, and more preferably from about 1.05 to 1.25.

In addition, the acrylic modifying monomer added in the step (2) can increase the solubility in and compatibility with water of the resin to achieve the purpose of reducing VOCs in the resin, but also increase the hardness and crosslink density of the coating, to allow the coating to have a much higher resistance to boiling and steam sterilization than simple polyester resin.

Through the above combination, the acrylic modified polyester resin prepared in the present disclosure has good resistance to boiling, is resistant to steam sterilization process, and has good adhesion to the substrate.

The operating temperatures of the above steps (1) to (2) are not particularly limited as long as the reaction can be smoothly performed and completed. For example, in the stepwise process, the polycondensation reaction to form the polyester prepolymer can be carried out at a temperature of about 150 to 230° C., preferably at a temperature of 170 to 230° C.; and then the cycloalkanedicarboxylic acid is added, and polycondensed at a temperature of about 150 to 230° C., and preferably at a temperature of 170 to 230° C. The step (2) can be carried out at a temperature of from 135 to 145° C., and preferably from 138 to 142° C.

In the step (1), an esterification catalyst and solvent may be added as needed. Examples of esterification catalysts are, for example, but not limited to: an organotin catalyst, an organotitanium catalyst or an organozinc catalyst. Commonly used catalysts include zinc acetate, zinc propionate, dibutyltin oxide, dibutyltin dilaurate, butyl titanate and isobutyl titanate.

In the step (2), a radical initiator may be added as needed, for example, but not limited to: an azo compound such as azobisisobutyronitrile (AIBN), azobiscyanovaleric acid (ACVA), 1,1'-azobis(cyclohexanecarbonitrile) (ACHN), and α-phenylazotriphenylmethane; and peroxides, such as dibenzoyl peroxide, dicumyl peroxide, diacetyl peroxide, dilauroyl peroxide, di-tert-butyl peroxide, and t-butyl peroxybenzoic acid; and a persulfate, such as ammonium peroxodisulfate, sodium peroxodisulfate, and potassium peroxodisulfate.

Coating Composition Comprising Acrylic Modified Polyester Resin

The present disclosure also provides a coating composition comprising the acrylic modified polyester resin as described above. In some embodiments, the coating composition of the present disclosure comprises an acrylic modified polyester resin as described above, a solvent and an optional additive. In some implementations, the coating composition is an aqueous coating composition.

The solvent may be water, an alcohol ether or a combination thereof. Examples of the alcohol ethers include, but are not limited to, ethylene glycol methyl ether, ethylene glycol ethyl ether, ethylene glycol propyl ether, ethylene glycol butyl ether; propylene glycol methyl ether, propylene glycol ethyl ether, propylene glycol propyl ether, propylene glycol butyl ether, and the like.

The additive which can be optionally added can be, for example, a pigment, a crosslinking agent, a curing agent, and a neutralizing agent, etc., and one or more additives are optionally added as needed.

The pigment may be an inorganic pigment or an cupric pigment, and examples include, but are not limited to, phthalocyanine blue, phthalocyanine green, per yellow, iron oxide red, iron oxide yellow, iron oxide black, zinc phosphate, titanium dioxide, calcium carbonate, barium sulfate, alumina, silica, carbon black, and metal powders.

The curing agent is generally an amino-resin or an aziridine curing agent.

The neutralizing agent may be N,N-dimethylethanolamine, N,N-diethylethanolamine, triethylamine, 2-amino-2-methyl-1-propanol, triethanolamine, diethanolamine, aqueous ammonia or a composition thereof Use of Aqueous Coating Composition The coating produced with the aqueous coating composition of the present disclosure has good adhesion to the surface of the coated article (hereinafter referred to as "substrate surface"). The substrate is, for example, but not limited to, a metal substrate, a plastic substrate, and a glass substrate, and preferably a metal substrate. The type of the metal substrate is not particularly limited, and may be, for example, iron, steel, aluminum, tin, tinplate or an alloy material composed of one or more metals.

In summary, the present disclosure has at least one or more of the fallowing advantages compared to the existing techniques:

(1) By introducing pentaerythritol into the polyester backbone, the crosslink density is increased, and water molecules are less likely to penetrate into the polyester structure, thereby inhibiting the hydrolysis.

(2) By introducing pentaerythritol and trial simultaneously in the polyester backbone, and by adjusting their ratio to a particular range, the crosslink density of the polyester is increased, the coating structure is strengthened, and the resin will not be gelled because of a too high crosslink density during the reaction process. During the boiling and steam sterilization process, even if some of the ester linkages in the polyester structure of the coating are degraded by hydrolysis, the structure is not disintegrated to an extent that would cause the coating to peel off.

(3) By introducing a cycloalkanedicarboxylic acid into the polyester backbone, an electron donating effect is exerted on the ester linkage of the polyester prepolymer; which inhibits the hydrolysis reaction and increases the storage stability of the coating composition and the stability of the coating.

(4) By further adding a cycloalkanedicarboxylic acid after preparing the polyester prepolymer, the obtained polymer has excellent storage stability in water.

The acrylic modified polyester resin prepared in the present disclosure has good hydrolysis resistance and high temperature resistance, and has good adhesion to the surface of the coated article, thus being applicable to a coating composition to provide protection and decorative effects. Moreover, the acrylic modified polyester resin produced in the present disclosure has good compatibility with water, and thus is particularly suitable for use in an aqueous coating composition, satisfying environmental protection requirements. The coating produced with the coating composition of the invention has good gloss, high chemical resistance, high hardness, high adhesion and high temperature and boiling resistance. Even in long-term exposure to high temperature and high humidity environments or an environment of sterilization by boiling water, the coating does not crack due to hydrolysis, and still maintains high gloss and high adhesion. Therefore, it has wide applications, for example, is particularly suitable for use in the food industry, automotive coating industry and construction industry, and is particularly suitable for use in an aqueous exterior coating for cans as a pier layer or a varnish layer.

The following examples are provided for exemplifying the embodiments and illustrating the technical features of the present disclosure, and not blended to limit the scope of the present disclosure. Any changes or equivalent arrangements that may readily occur to persons skilled in the art are within the protection scope of the present disclosure as defined by the appended claims.

EXAMPLES

Preparation of Acrylic Modified Polyester Resin

Example 1

The monomer (A-1), the monomer (A-2), the monomer (A-3), the monomer (A-4) and the catalyst were fed into the reactor according to the proportions shown in Table 2, and nitrogen was then introduced. The temperature was slowly raised to 230° C. with stirring to carry out an esterification reaction until the acid value was less than 6 mg KOH/g resin, and then the reaction solution was cooled to 140° C.

Then, the monomer (B) was fed to the reactor, and nitrogen was continuously introduced. The temperature was slowly raised to 230° C. with storing to carry out an esterification reaction until the acid value was less than 8 mg KOH/g resin. The reaction solution was diluted with ethylene glycol butyl ether. The solid content of the resulting polyester was about 70 wt %, the viscosity was Z5-Z7, and the resin was cooled to 135 to 145° C.

The monomer (C) and the initiator were slowly added dropwise to the reactor over about 2 hrs; the reaction was carried out at 140° C. for 2 hrs until the viscosity no longer increased, to obtain an acrylic modified polyester resin. The obtained acrylic modified polyester resin has an acid value of 40-50 mgKOH/g resin and a solid content of about 65±1 wt %.

Examples 2 to 5 and Comparative Examples 1 to 4, 6 and 8

The acrylic modified polyester resins of Examples 2 to 5 and Comparative Examples 1 to 4, 6 and 8 were prepared as described in Example 1 according to the proportions listed in Table 2.

Comparative Example 5

The monomer (A-1), the monomer (A-2), the monomer (A-3), the monomer (A-4), the monomer (B), the solvent and the catalyst were fed into the reactor according to the proportions shown in Table 2, and nitrogen was introduced. The temperature was slowly raised to 230° C. with stirring to carry out an esterification reaction until the acid value was less than 8 mg KOH/g resin. The reaction solution was diluted with a suitable amount of ethylene glycol butyl ether. The solid content of the resulting polyester was about 70 wt %, the viscosity was Z5-Z7, and the resin was cooled to 135 to 145° C.

The monomer (C) and the initiator were slowly added dropwise to the reactor over about 2 hrs; the reaction was carried out at 140° C. for 2 hrs until the viscosity no longer increased, to obtain an acrylic modified polyester resin.

Comparative Example 7

The monomer (A-2), the monomer (A-3), the monomer (A-4), the solvent and the catalyst were fed into the reactor according to the proportions shown in Table 2, and nitrogen was then introduced. The temperature was slowly raised to 230° C. with stirring to cavy out an esterification reaction until the acid value was less than 6 mg KOH/g resin, and then the reaction solution was cooled to 140° C.

Next, glycidyl tert-carbonate was added and the reaction was continued until the acid value was less than 8 mgKOH/g resin. The reaction solution was diluted with a suitable amount of ethylene glycol butyl ether. The solid content of the resulting polyester was about 70 wt %, the viscosity was Z5-Z7, and the resin was cooled to 135 to 145° C.

The monomer (C) and the initiator were slowly added dropwise to the reactor over about 2 hrs; the reaction was carried out at 140° C. for 2 hrs until the viscosity no longer increased, to obtain an acrylic modified polyester resin.

Comparative Example 9

Commercially available polyester resin: ETERKYD 5050-B-75 (Eternal Materials)

<Preparation of Coating Composition>

36 g of the acrylic modified polyester resin obtained in Examples 1 to 5 or Comparative Examples 1 to 8 or the commercially available polyester resin of Comparative Example 9, 2.4 g of N,N-diethylthanolamine, 2.5 g of the cosolvent ethylene glycol monobutyl ether (Butyl Cellosove; Dow Chemical Company, USA), 15 g of reverse osmosis water and 20 g of titanium dioxide (R902+/DuPont) were fully mixed by stirring at 3000 rpm for 2 his, and then mixed with 6 g of the curing agent (Cymel®303; Cytec, USA), to prepare a coating composition <Preparation of Coating>

A tinned plate was used as a substrate, and a roller bar NO. 55 (winding diameter: 1.4 m/m; wet film thickness: 128.73 μm) was used to apply the coating composition to the substrate by roller coating. The substrate was baked in an oven at 120° C. for 30 min, and then heated to 200° C. and baked for 10 min to complete the film formation by thermal curing.

<Resin Property Test>

Determination of Solid Content

The blank weight of an aluminum dish was weighed and recorded as W0, then 0.45-0.55 g of the resin was evenly placed and spread in the aluminum dish and weighed together with the aluminum dish, and the obtained weight from which the blank weight of the aluminum dish was subtracted was recorded as W1. Next, the aluminum dish with resin was placed in an oven at 150° C. for 15 ruin to remove the solvent, and then was taken out, cooled to room temperature and weighed. The weight was recorded as W2.

Solid content (%)=$(W2-W0)*100\%/W1$

Determination of Molecular Weight (Mw, Mn) and Molecular Weight Distribution (Polydispersity Index: PDI=Mw/Mn)

$M_w$ and $M_n$ were determined by gel permeation chromatography (GPC) (High pressure pump system: Waters 1515 Isocratic from Waters International Co., Ltd.; liquid chromatography and autosampler: Waters 717; detector: Waters 2414), in which the solvent was tetrahydrofuran (THF), the chromatographic column was Waters Styragel Columns HR 4E, HR 3, HR 1, and HR 0.5 used in series, the column temperature was 40° C. and the flow rate was 0.6 ml/min. The weight average molecular weight (Mw) and the molecular weight distribution (Mw/Mn) are determined with the use of polystyrene standards.

Determination of Viscosity

The viscosity was measured by the bubble viscometer (GARDNER) standard method. The resin sample was poured into a specific viscometer tube (GARDNER tube, D=10.65±0.25 mm) to reach the lower marker line, then the opening of the tube was sealed with a cork stopper, and the stopper was pressed to reach the upper marker line of the viscometer tube. Then, the viscometer tube (sample tube) containing the resin and the viscometer tubes containing the standard were placed in a constant-temperature water bath at 25° C. for about 20 min. Then, the sample tube was placed side by side with the standard viscometer tubes, and quickly inverted by 180 degrees to compare the velocity of the bubble rising inside the sample tube with those of the standard viscometer tubes, find out the standard viscometer tube having the closest result and record the designation of the standard viscometer tube. The designation and the corresponding viscosity are shown in Table 1.

TABLE 1

| Designation | Z1 | Z2 | Z3 | Z4 | Z5 | Z6 | Z7 |
|---|---|---|---|---|---|---|---|
| Viscosity (stoke) | 27 | 34 | 46.3 | 62 | 93.5 | 148 | 200 |

Determination of Acid Value

About 1 g of the sample was weighed and dissolved in 20 ml of a neutral toluene/alcohol solution (toluene:alcohol=1:1), and shaken to completely dissolve the sample, and then a phenolphthalein indicator was added. It was then titrated with a solution of 0.1N potassium hydroxide in ethanol until the solution appeared reddish.

Acid value (mgKOH/g)=(titrated milliliter (mL) *0.1N*56.1)/(sample weight (g)*solid content (%))

Pyrolysis-Gas Chromatography-Mass Spectrometry (PY-GC-MS)

The acrylic modified polyester resin prepared in each of the examples and the comparative examples was analyzed using JHP-5 pyrolysis gas chromatograph-mass spectrometer available from JAI, Japan. The analysis method was detailed as follows:

1-2 mg of the sample and 0.5 ml of tetramethylammonium hydroxide (Sigma-Aldrich 334901) were uniformly mixed, placed in a metal foil (for example, nickel, cobalt, nickel or an alloy thereof), heated to 536° C. and pyrolyzed for 10 seconds. The metal foil was folded in half and then further folded in half to envelop the sample. The sample in the metal foil was then analyzed by on-line pyrolysis-gas chromatography-mass spectrometry (PY-GC-MS).

The temperature program of the gas chromatograph is: injection port temperature 280° C., initial temperature 40° C. for 2 mm, rising to 60° C. at a rate of 4° C./min and holding for 0.5 min, then rising to 300° C. at a rate of 10° C./min and holding for 20 min.

The parameters that can be optionally adjusted include, for example: the instantaneous pyrolysis temperature of the sample can be 500-550° C.; the temperature of the Curie point pyrolyzer is set to 250° C., so that the pyrolyzed sample is maintained in the gas phase; the working condition of the gas chromatography can be set to have a carrier gas flow rate that is helium gas in a constant pressure mode of 12 psi and a split ratio of 80:1 to 100:1; and the working conditions of the mass spectrometer can include detection with an EI source in positive ion mode having an electron energy of 70 eV and an ion source temperature of 230° C., a mass spectrometer interface temperature of 280° C., a scanning mode of full scan mode (29~650 amu), and a solvent delay of 1.9 min.

Data analysis and sample identification: According to the total ion chromatographic data and mass spectrometric data obtained by the test, the composition and relative content of the alcohols in the sample can be obtained by comparison and calculation. By dividing the sum of the signal integral value of pentaerythritol by the sum of the signal integral value of the triol (1,1,1-trimethylolpropane), the ratio of the signal integral values of pentaerythritol to the triol is obtained and recorded in Table 3.

Figure 2A:
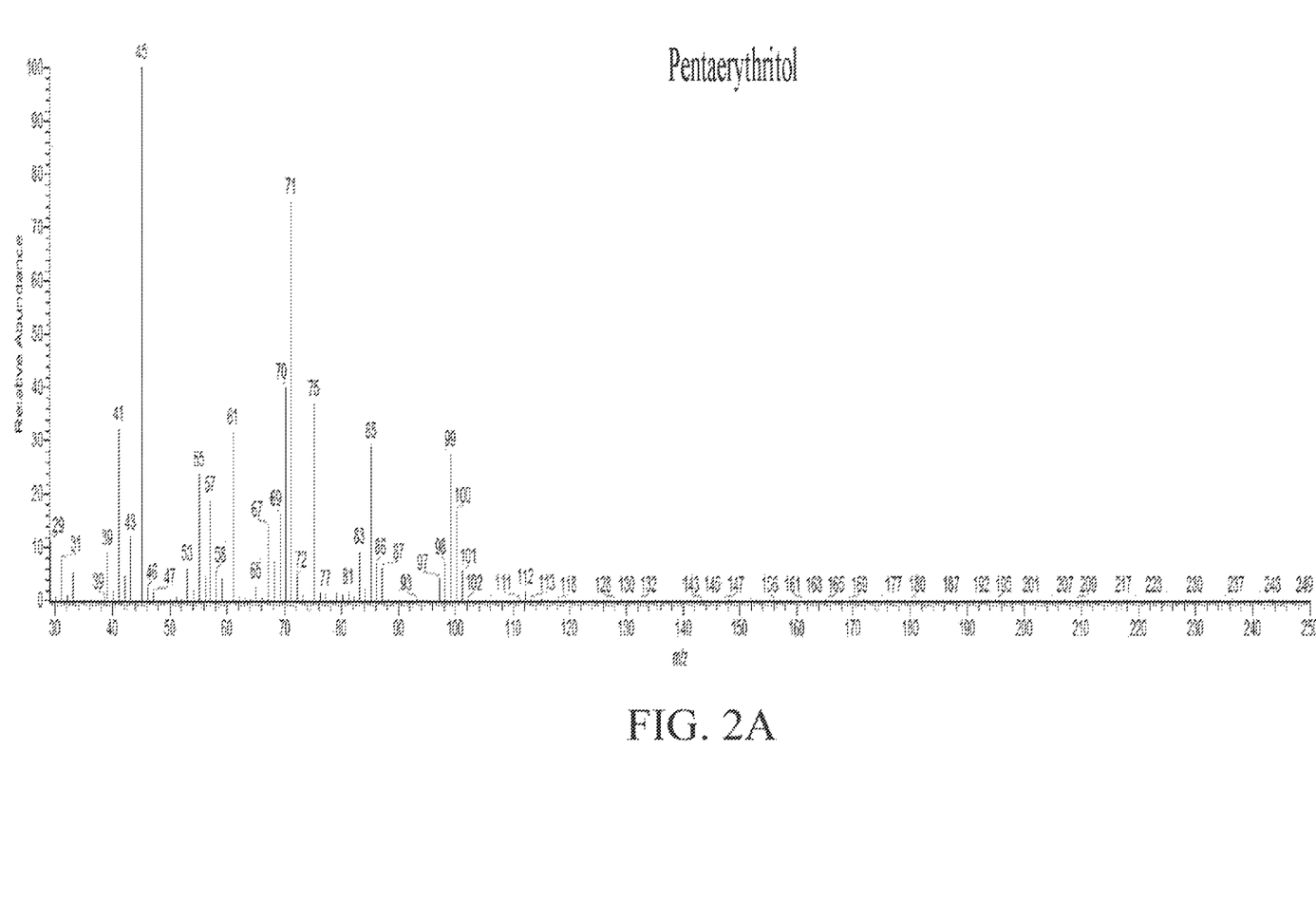
FIG. 2 shows a spectrum of pentaerythritol and triol (1,1,1-trimethylolpropane) standard samples obtained by pyrolysis-gas chromatography-mass spectrometry.
Figure 2B:
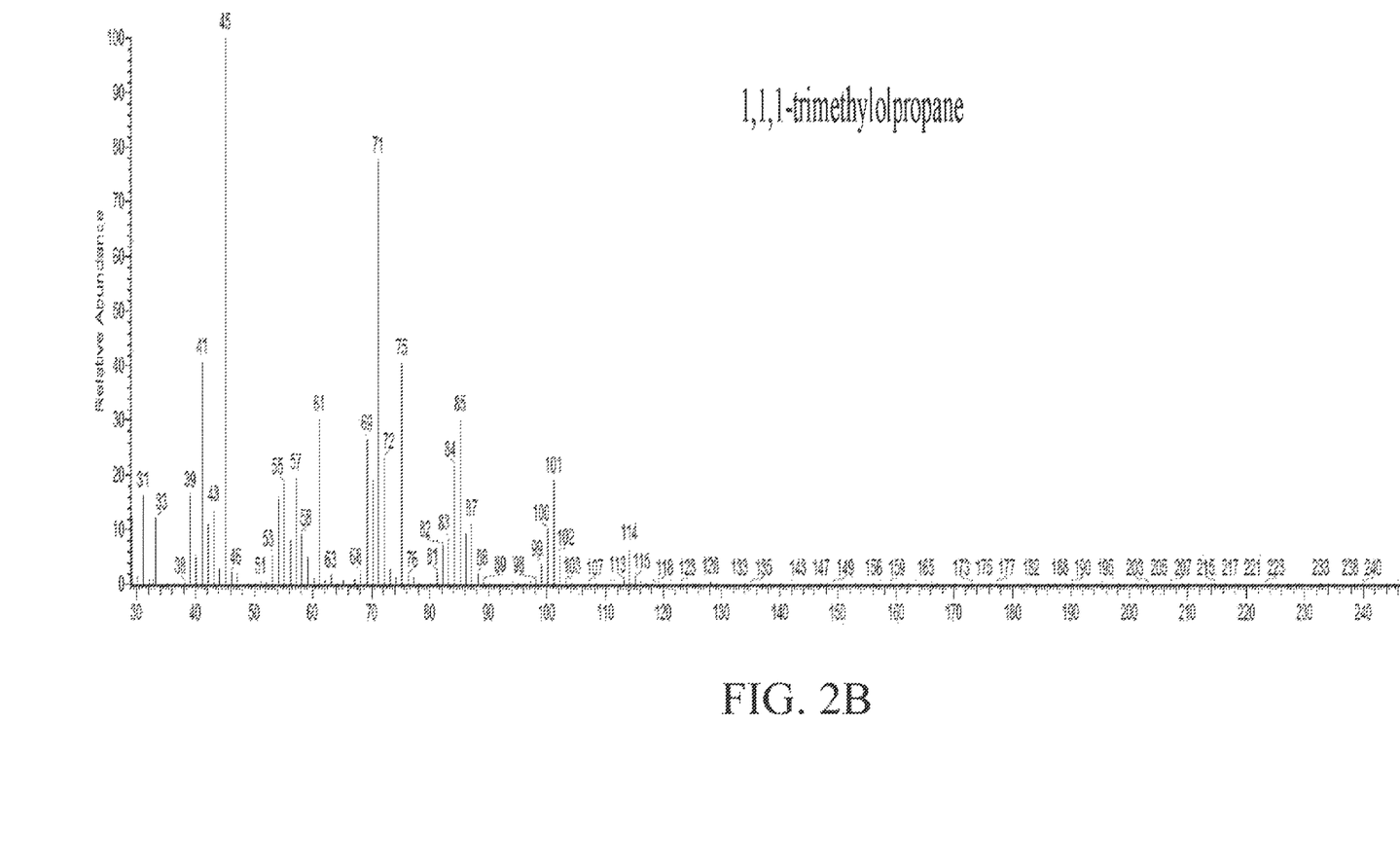

FIG. 2 shows a spectrum of pentaerythritol and triol (1,1,1-trimethylolpropane) standards obtained by pyrolysis-gas chromatography-mass spectrometry.

Figure 3:
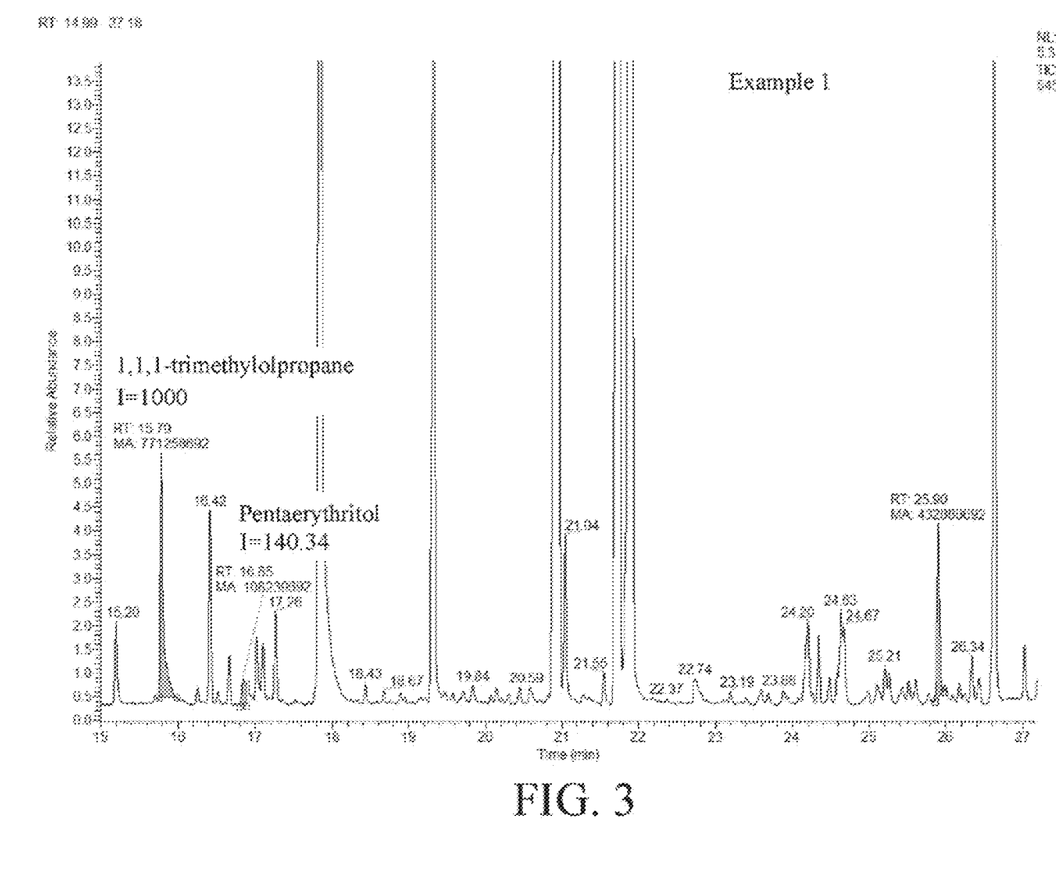
FIG. 3 shows the total ion chromatographic data of the acrylic modified polyester resin of Example 1 according to pyrolysis-gas chromatography-mass spectrometry.

FIG. 3 shows the total ion chromatographic data of the acrylic modified polyester resin of Example 1 according to pyrolysis-gas chromatography-mass spectrometry.

Figure 4:
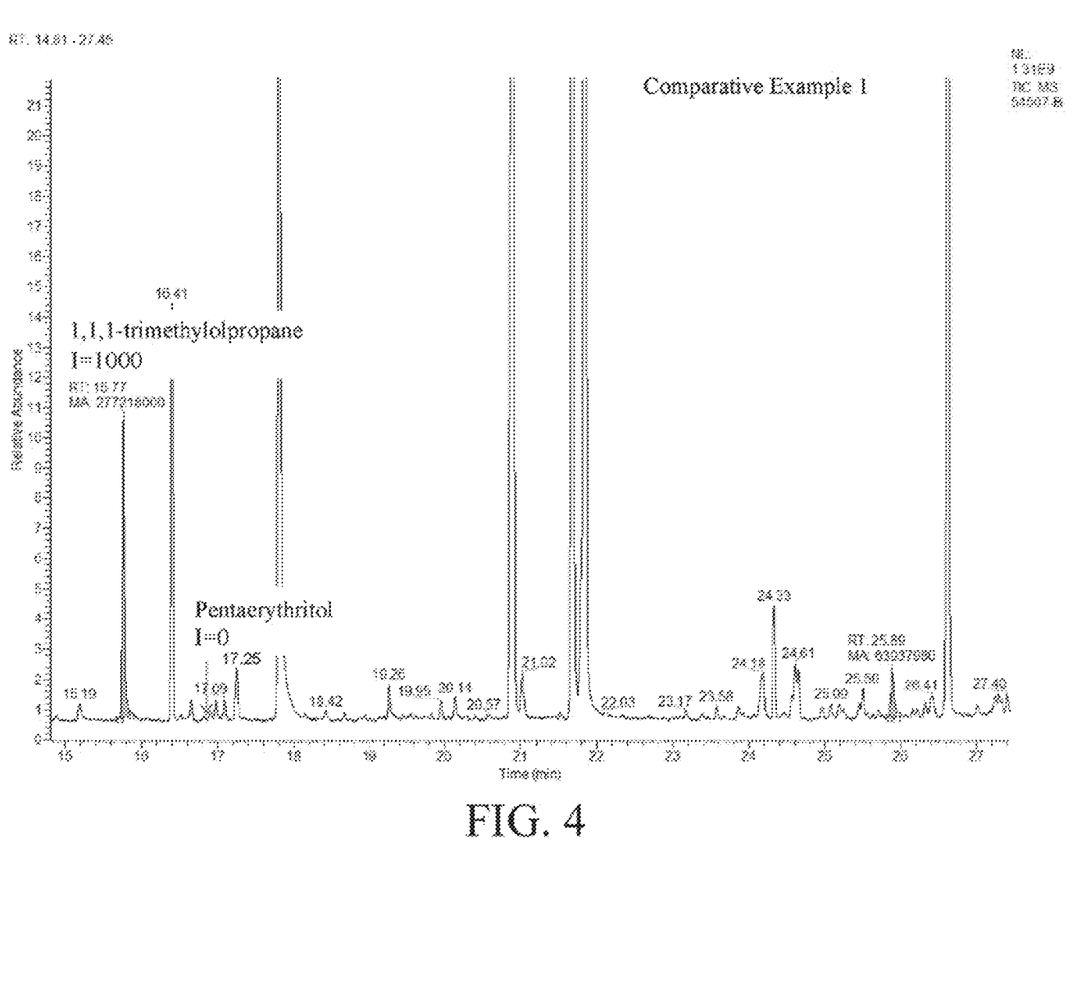
FIG. 4 shows the total ion chromatographic data of the acrylic modified polyester resin of Comparative Example 1 according to pyrolysis-gas chromatography-mass spectrometry.

FIG. 4 shows the total ion chromatographic data of the acrylic modified polyester resin of Comparative Example 1 according to pyrolysis-gas chromatography-mass spectrometry.

<Coating Property Test>

Gloss of Coating

Gloss of the coating was determined according to GB/T9754-200 Paints and varnishes—Determination of specular gloss of non-metallic paint films.

Hardness of Coating

Hardness of the coating was determined according to GB/T6739-2006 Paints and varnishes—Determination of film hardness by pencil, test.

Adhesion of Coating to a Surface of Substrate

Adhesion of the coating to the surface of a substrate was determined according to GB/T9286-1998 Paints and varnishes—Cross cut test for films.

Flexibility of Coating

Flexibility of the coating was determined according to GB/T1731-1993 Determination of flexibility of films.

Solvent Resistance Test

The coating was subjected to a back-and-forth rubbing test in the MEK abrasion tester (Abrasion Test A20-339) with the use of an all cotton fabric impregnated with the solvent methyl ethyl ketone and under a force of 1000 g. Whether the coating was damaged or peeled off due to rubbing was observed. The result was recorded after each back-and-forth round trip. If no damage or peeling off is found in the coating after more than 100 times of back-and-forth rubbing, it is recorded as ">100."

Steam Sterilization Resistance Test

The coated substrate was placed into a high-temperature sterilized autoclave (TM-328) with pressurized saturated steam at 121° C. and heated for 30 min, then the pressure was released and the temperature was cooled to room temperature.

<Stability Test of Coating Composition>

About 2 g of N,N-diethylethanolamine was added to 35 g of the coating composition at normal temperature, then 35 g of reverse osmosis water was added, and stirred until uniform. The vessel containing the mixed solution was sealed, and placed in an oven at 60° C. to observe changes of the resin

TABLE 2

(in moles)

| Monomer | Raw material | Ex 1 | Ex 2 | Ex 3 | Ex 4 | Ex 5 |
|---|---|---|---|---|---|---|
| (A-1) | Pentaerythritol | 0.035 | 0.07 | 0.011 | 0.035 | 0.035 |
| (A-2) | 1,1,1-trimethylolpropane | 0.19 | 0.19 | 0.19 | 0.19 | 0.19 |
| (A-3) | Neopentyl glycol | 1.13 | 1.05 | 1.18 | 1.13 | 1.13 |
|  | 2-butyl-2-ethyl-1,3-propylene glycol | 0.56 | 0.56 | 0.56 | 0.56 | 0.56 |
|  | Ethylene glycol | 0.17 | 0.17 | 0.17 | 0.17 | 0.17 |
| (A-4) | Butenedioic anhydride | 0.13 | 0.13 | 0.13 | 0.13 | 0.13 |
|  | Terephthalic acid | 0.47 | 0.47 | 0.47 | 0.47 | 0.47 |
|  | Isophthalic acid | 0.54 | 0.54 | 0.54 | 0.54 | 0.54 |
|  | 1,2,4-benzenetricarboxylic anhydride | 0.05 | 0.05 | 0.05 | 0.05 | 0.05 |
| (B) | 1,4-cyclohexanedicarboxylic acid | 0.57 | 0.57 | 0.57 | 0 | 0.57 |
|  | Hexahydrophthalic anhydride | 0 | 0 | 0 | 0.53 | 0 |
| (C) | Methacrylic acid | 0.49 | 0.48 | 0.46 | 0.48 | 0 |
|  | Acrylic acid | 0 | 0 | 0 | 0 | 0.49 |
|  | Butyl acrylate | 0.73 | 0.73 | 0.69 | 0.73 | 0.73 |
|  | Methyl methacrylate | 0.25 | 0.25 | 0.23 | 0.25 | 0.25 |
|  | 2-hydroxyethyl methacrylate | 0.31 | 0.31 | 0.30 | 0.31 | 0.31 |
| Catalyst | Organotin compound (Fascat 4100) | 0.0002 | 0.0002 | 0.0002 | 0.0002 | 0.0002 |
| Initiator | Tert-butylperoxybenzoic acid | 0.01 | 0.01 | 0.095 | 0.01 | 0.01 |
| Solvent | Ethylene glycol butyl ether | 2.92 | 2.92 | 2.90 | 2.92 | 2.92 |

| Monomer | Raw material | Comp. Ex 1 | Comp. Ex 2 | Comp. Ex 3 | Comp. Ex 4 | Comp. Ex 5 | Comp. Ex 6 | Comp. Ex 7 | Comp. Ex 8 |
|---|---|---|---|---|---|---|---|---|---|
| (A-1) | Pentaerythritol | 0 | 0.18 | 0.0035 | 0.035 | 0.035 | 0.035 | 0 | 0.18 |
| (A-2) | 1,1,1-trimethylolpropane | 0.19 | 0.19 | 0.19 | 0.19 | 0.19 | 0.19 | 0.19 | 0 |
| (A-3) | Neopentyl glycol | 1.20 | 0.95 | 1.19 | 1.13 | 1.13 | 1.13 | 1.13 | 1.13 |
|  | 2-butyl-2-ethyl-1,3-propylene glycol | 0.56 | 0.56 | 0.56 | 0.56 | 0.56 | 0.56 | 0.56 | 0.56 |
|  | Ethylene glycol | 0.17 | 0.17 | 0.17 | 0.17 | 0.17 | 0.17 | 0.17 | 0.17 |
| (A-4) | Butenedioic anhydride | 0.13 | 0.13 | 0.13 | 0.13 | 0.13 | 0.24 | 0.13 | 0.13 |
|  | Terephthalic acid | 0.47 | 0.47 | 0.47 | 0.69 | 0.47 | 0.46 | 0.71 | 0.47 |
|  | Isophthalic acid | 0.54 | 0.54 | 0.54 | 0.79 | 0.54 | 0.52 | 0.81 | 0.54 |
|  | 1,2,4-benzenetricarboxylic anhydride | 0.05 | 0.05 | 0.05 | 0.08 | 0.05 | 0.05 | 0.05 | 0.05 |
| (B) | 1,4-cyclohexanedicarboxylic acid | 0.57 | 0.57 | 0.57 | 0 | 0.57 | 0.55 | — | 0.57 |
|  | Gycidyl (tert)carbonate | 0 | 0 | 0 | 0 | 0 | 0 | 0.12 | 0 |
| (C) | Methacrylic acid | 0.49 | 0.48 | 0.49 | 0.48 | 0.49 | 0.5 | 0.49 | 0.49 |
|  | Butyl acrylate | 0.73 | 0.73 | 0.73 | 0.72 | 0.73 | 0.74 | 0.73 | 0.73 |
|  | Methyl methacrylate | 0.25 | 0.25 | 0.25 | 0.24 | 0.25 | 0.25 | 0.25 | 0.25 |
|  | 2-hydroxyethyl methacrylate | 0.31 | 0.30 | 0.31 | 0.30 | 0.31 | 0.31 | 0.31 | 0.31 |
| Catalyst | Organotin compound (Fascat 4100) | 0.0002 | 0.0002 | 0.0002 | 0.0002 | 0.0002 | 0.0002 | 0.0002 | 0.0002 |
| Initiator | Tert-butylperoxybenzoic acid | 0.01 | 0.01 | 0.01 | 0.0098 | 0.01 | 0.01 | 0.01 | 0.01 |
| Solvent | Ethylene glycol butyl ether | 2.93 | 2.90 | 2.93 | 2.90 | 2.93 | 2.94 | 2.90 | 2.92 |

TABLE 3

| Property | | Ex 1 | Ex 2 | Ex 3 | Ex 4 | Ex 5 |
|---|---|---|---|---|---|---|
| Resin | Solid content (wt %) | 65.12% | 64.38% | 65.68% | 64.89% | 65.79% |
| | Molecular weight (Mn) | 1313 | 1385 | 1037 | 1200 | 1271 |
| | PDI | 15 | 19.15 | 9.53 | 14.65 | 13.40 |
| | Viscosity | Z4-Z5 | Z4-Z5 | Z4-Z5 | Z4-Z5 | Z4-Z5 |
| | Acid value (mgKOH/g) | 44.32 | 48.23 | 43.93 | 40.16 | 40.12 |
| Resin coating | Goss (60°) | 82-86 | 83-84 | 79-83 | 82-84 | 76-79 |
| | Hardness | 2H | H | H | H | 2H |
| | Solvent resistance | >100 | >100 | >100 | >100 | >100 |
| | Flexibility | 1 | 1 | 1 | 1 | 1 |
| | Goss (60°) after steam sterilization resistance test | 76-82 | 74-78 | 70-73 | 76-82 | 67-70 |
| | Solvent resistance after steam sterilization resistance test | 64 | 79 | 60 | 71 | 69 |
| Stability (60° C.) | 0 hr | Gear | Gear | Clear | Clear | Clear |
| | 120 hrs | Gear | Gear | Clear | Gear | Clear |
| Chromatographic integral value | Pentaerythritol/1,1,1-trimethylolpropane | 140.34/1000 | 303.0/1000 | 70.57/1000 | 137.16/1000 | 127.45/1000 |

| Property | | Comp. Ex 1 | Comp. Ex 2 | Comp. Ex 3 | Comp. Ex 4 | Comp. Ex 5 | Comp. Ex 6 | Comp. Ex 7 | Comp. Ex 8 |
|---|---|---|---|---|---|---|---|---|---|
| Resin | Solid content (wt %) | 65.30% | Gelation | 66.0% | 65.55% | 64.94% | 65.38% | 64.66% | 66% |
| | Molecular weight | 993 | — | 1149 | 1233 | 1007 | 3543 | 1638 | 1392 |
| | PDI | 8.40 | — | 8.14 | 8.3 | 10.5 | 30.2 | 13.34 | 15.71 |
| | Viscosity | Z2-Z3 | — | Z3-Z4 | Z5-Z6 | Z4-Z5 | >Z7 | Z4-Z5 | Z5-Z6 |
| | Acid value (mgKOH/g) | 46.3 | — | 45.0 | 48.72 | 44.6 | 45.32 | 43.57 | 49.1 |
| Resin coating | Gloss (60°) | 70-75 | — | 73-75 | 72-77 | 70-75 | — | 73-78 | 72-78 |
| | Hardness | HB | — | HB | 2H | 2H | — | H | H |
| | Solvent resistance | >100 | — | >100 | >100 | >100 | — | >100 | >100 |
| | Flexibility | 1 | — | 1 | 1 | 1 | — | 1 | 1 |
| | Gloss (60°) after steam sterilization resistance test | 34-45 | — | 38-39 | 66-72 | 54-60 | — | 31-33 | 45-48 |
| | Solvent resistance after steam sterilization resistance test | 42 | — | 46 | 60 | 57 | — | 5 | 38 |
| Stability (60° C.) | 0 hrs | Clear | — | Clear | Slightly cloudy | Slightly cloudy | Cloudy | Clear | Clear |
| | 120 hrs | Separated into layers | — | Separated into layers | Separated into layers | Separated into layers | — | Separated into layers | Separated into layers |
| Chromatographic integral value | Pentaerythritol/1,1,1-trimethylolpropane | 0 | — | 43.84/1000 | 145.48/1000 | 149.46/1000 | 158.12/1000 | 0 | — |

Result Evaluation

Figure 1:
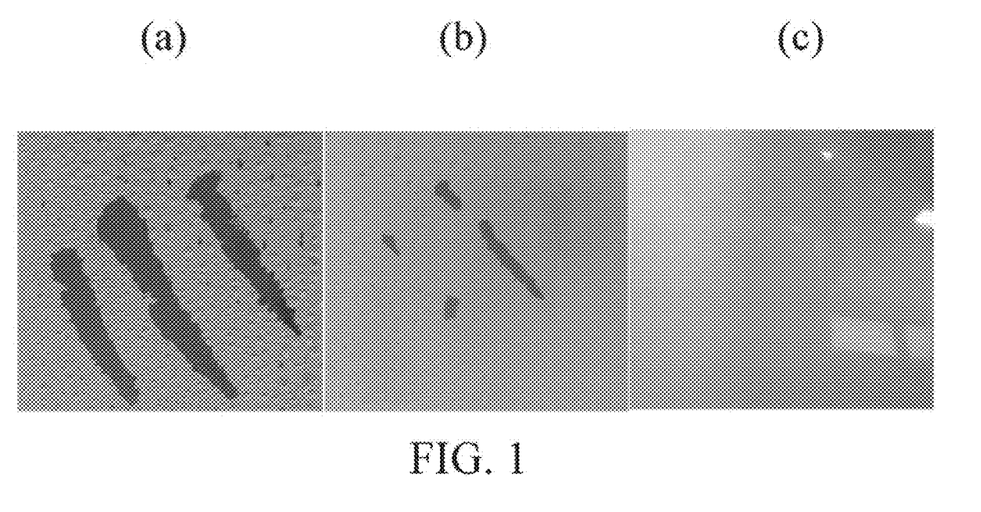
FIGS. 1(a) to 1(c) are photographs showing the appearance of a coating prepared from the polyester according to Comparative Example 9, Comparative Example 1 and Example 1, respectively, after a steam sterilization resistance test.

As shown in FIG. 1, after the steam sterilization resistance test, the coating (a) formed from the commercially available polyester resin of Comparative Example 9 and the coating (b) formed from the acrylic modified polyester resin of Comparative Example 1 have obvious peeling of and the gloss is not good. In contrast, the coating (c) formed from the acrylic modified polyester resin of Example 1 has a good adhesion to the substrate, has no peeling off after the steam sterilization resistance test, and can maintain good gloss.

As can be seen from Table 3, the coating prepared from the acrylic modified polyester resin according to the present disclosure has good gloss and chemical resistance, high hardness and can withstand high temperature and boiling water. In addition, it can maintain good gloss and good solvent resistance without disintegration due to hydrolysis even after the steam sterilization resistance test. Further, the acrylic modified polyester resin of the present disclosure has good compatibility with water, and can maintain good stability even after dilution with water, so it is suitable for a water thimble resin to further solve environmental problems.

In addition, the ratio of the signal integral values of pentaerythritol to the triol in the PY-GC-MS spectrum of the acrylic modified polyester resin of the present disclosure falls within the range of 0.05 to 0.35, and the formed coating has gloss at 60° of at least about 76 measured according to the GB/T9754-2007 standard, and has gloss at 60° of at least 67 after the steam sterilization resistance test. The polyesters of the comparative examples cannot meet all of the above conditions.

Since pentaerythritol is not used in Comparative Examples 1 and 7 and the amount of pentaerythritol is too low in Comparative Example 3, the obtained coatings are not resistant to steam sterilization, are hydrolyzed at a high temperature, and have poor gloss and solvent resistance. Gelation occurs in Comparative Example 2 due to the addition of too latch pentaerythritol.

In Comparative Example 4, no cycloalkanedicarboxylic acid is used, the obtained polymer is less stable in water and hydrolysis occurs. Therefore, the resulting aqueous coating composition was cloudy. In Comparative Example 5, a cycloalkanedicarboxylic acid is added during the preparation of the polyester prepolymer, and the stability of the obtained polymer in water is also poor.

In Comparative Example 6, a higher content of butenedioic anhydride is used, and the viscosity of the resin is rapidly increased. This may attribute to self-crosslinking due to the presence of a large number of double bonds. The resulting aqueous coating composition is white and cloudy.

In Comparative Example 7, conventional glycidyl (tert) carbonate is used, and the resulting coating composition is poor in storage stability. In addition, since no pentaerythritol is used, the coating is not resistant to steam sterilization, is hydrolyzed at a high temperature, and has poor gloss and solvent resistance.

In Comparative Example 8, no triol is used, and it is unable to provide a proper degree of branching, through the synergistic effect of pentaerythritol and triol, to the resin structure of the coating for forming a dense network. Therefore, the gloss and solvent resistance of the coating after the steam sterilization resistance test are not good.

What is claimed is:

1. An acrylic modified polyester resin, comprising:
   (i) a polyester, comprising a unit derived from a polyester prepolymer and a cycloalkanedicarboxylic acid monomer, wherein the polyester prepolymer is prepared by polycondensation of the following monomers:
   (A-1) pentaerythritol,
   (A-2) a triol,
   (A-3) a diol, and
   (A-4) an organic polycarboxylic acid monomer, or an ester or an anhydride thereof, wherein the organic polycarboxylic acid comprises an aromatic polycarboxylic acid, an alkane-polycarboxylic acid, an alkene-polycarboxylic acid or a combination thereof; and
   (ii) a (meth)acrylic monomer grafted to the polyester, where at least one of the monomers (A-2), (A-3) and (A-4) has a double bond, and the (meth)acrylic monomer is grafted to the polyester through a reaction with the double bond,
   wherein the ratio by mole of the monomer (A-1) to the monomer (A-2) is from about 0.02 to about 0.9,
   the monomer (A-1) is in a content of from 0.07 mol % to 3 mol %, based on the total moles of the monomers for forming the acrylic modified polyester resin,
   the monomer (A-2) is in a content of from 0.1 mol % to 10 mol %, based on the total moles of the monomers for forming the acrylic modified polyester resin, and
   the cycloalkanedicarboxylic acid is in a content of from 5 mol % to 15 mol %, based on the total moles of the monomers for forming the acrylic modified polyester resin.

2. The acrylic modified polyester resin according to claim 1, wherein the ratio by mole of the monomer (A-1) to the monomer (A-2) is from about 0.04 to about 0.6.

3. The acrylic modified polyester resin according to claim 1, wherein the monomer (A-1) is in a content of from 0.1 mol % to 2.5 mol %, based on the total moles of the monomers for forming the acrylic modified polyester resin.

4. The acrylic modified polyester resin according to claim 1, wherein the monomer (A-2) is selected from the group consisting of an alkyl triol, an alkenyl triol, a cycloalkyl triol, and a combination thereof.

5. The acrylic modified polyester resin according to claim 1, wherein the monomer (A-2) is in a content of from 1 mol % to 5 mol %, based on the total moles of the monomers for forming the acrylic modified polyester resin.

6. The acrylic modified polyester resin according to claim 1, wherein the cycloalkanedicarboxylic acid is selected from the group consisting of cyclopropanedicarboxylic acid, cyclobutanedicarboxylic acid, cyclopentanedicarboxylic acid, cyclohexanedicarboxylic acid, and hexahydrophthalic anhydride and a combination thereof.

7. The acrylic modified polyester resin according to claim 1, wherein the cycloalkanedicarboxylic acid is in a content of from 6 mol % to 13 mol %, based on the total moles of the monomers for forming the acrylic modified polyester resin.

8. The acrylic modified polyester resin according to claim 1, wherein the (meth)acrylic monomer is acrylic acid, methacrylic acid, methyl acrylate, ethyl acrylate, butyl acrylate, hydroxyethyl acrylate, hydroxypropyl acrylate, hydroxybutyl acrylate, lauryl acrylate, 2-ethylhexyl acrylate, methyl methacrylate, butyl methacrylate, hydroxyethyl methacrylate, hydroxypropyl methacrylate, isobornyl methylacrylate, lauryl methacrylate, 2-hydroxyethyl methacrylate, 2-ethylhexyl methacrylate, or a combination thereof.

9. The acrylic modified polyester resin according to claim 1, wherein the (meth)acrylic monomer is in a content of from 20 mol % to 60 mol %, based on the total moles of the monomers for forming the acrylic modified polyester resin.

10. The acrylic modified polyester resin according to claim 1, wherein in the spectrum obtained by pyrolysis-gas chromatography-mass spectrometry (PY-GC-MS) of the acrylic modified polyester resin, the ratio of the signal integral values of pentaerythritol to the triol is between 0.05 and 0.35, and the coating formed by the acrylic modified polyester resin has a gloss at 60° of at least 76 measured according to the GB/T9754-2007 standard.

11. A method for preparing the acrylic modified polyester resin according to claim 1, comprising the steps of:
    (1) polycondensing the monomers (A-1), (A-2), (A-3), and (A-4), and a cycloalkanedicarboxylic acid to form a polyester, wherein at least one of the monomers (A-2), (A-3) and (A-4) has a double bond; and
    (2) grafting a (meth)acrylic monomer to the polyester by reacting with the double bond, to form the acrylic modified polyester resin.

12. An aqueous coating composition, comprising an acrylic modified polyester resin according to claim 1.

* * * * *